United States Patent
Nakagawa

(10) Patent No.: US 7,800,718 B2
(45) Date of Patent: Sep. 21, 2010

(54) ELECTRO-OPTICAL DEVICE AND ELECTRONIC APPARATUS HAVING A LIGHT-SHIELDING FILM AT LEAST PARTIALLY OVERLAPPING WITH A TRANSISTOR IN PLAN VIEW AND HAVING A PLURALITY OF OPENINGS OVERLAPPING WITH THE TRANSISTOR

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 134 days.

(21) Appl. No.: 12/173,544

(22) Filed: Jul. 15, 2008

(65) Prior Publication Data
US 2009/0033819 A1   Feb. 5, 2009

(30) Foreign Application Priority Data

Aug. 2, 2007 (JP) ............................. 2007-201651
May 27, 2008 (JP) ............................. 2008-137918

(51) Int. Cl.
*G02F 1/1335* (2006.01)
*G02F 1/136* (2006.01)
*G02F 1/1345* (2006.01)
*H01L 23/52* (2006.01)

(52) U.S. Cl. ............................. 349/110; 349/42; 349/43; 349/111; 349/151; 257/431; 257/434; 257/435; 257/749

(58) Field of Classification Search ............. 349/42–44, 349/110, 111, 151
See application file for complete search history.

(56) References Cited

U.S. PATENT DOCUMENTS

2001/0019384 A1*   9/2001   Murade ..................... 349/110
2003/0076459 A1*   4/2003   Murade ..................... 349/111

FOREIGN PATENT DOCUMENTS

| JP | 09-307115 | 11/1997 |
| JP | 10-070277 | 3/1998 |
| JP | 11-194360 | 7/1999 |
| JP | 2000-275677 | 10/2000 |

\* cited by examiner

*Primary Examiner*—Andrew Schechter
*Assistant Examiner*—Paul C Lee
(74) *Attorney, Agent, or Firm*—AdvantEdge Law Group, LLC

(57) ABSTRACT

An electro-optical device includes: a light-shielding film provided below a transistor in a peripheral area surrounding a pixel area of the display. The light-shielding film includes a rectangular opening formed in a channel length direction of the transistor.

10 Claims, 13 Drawing Sheets

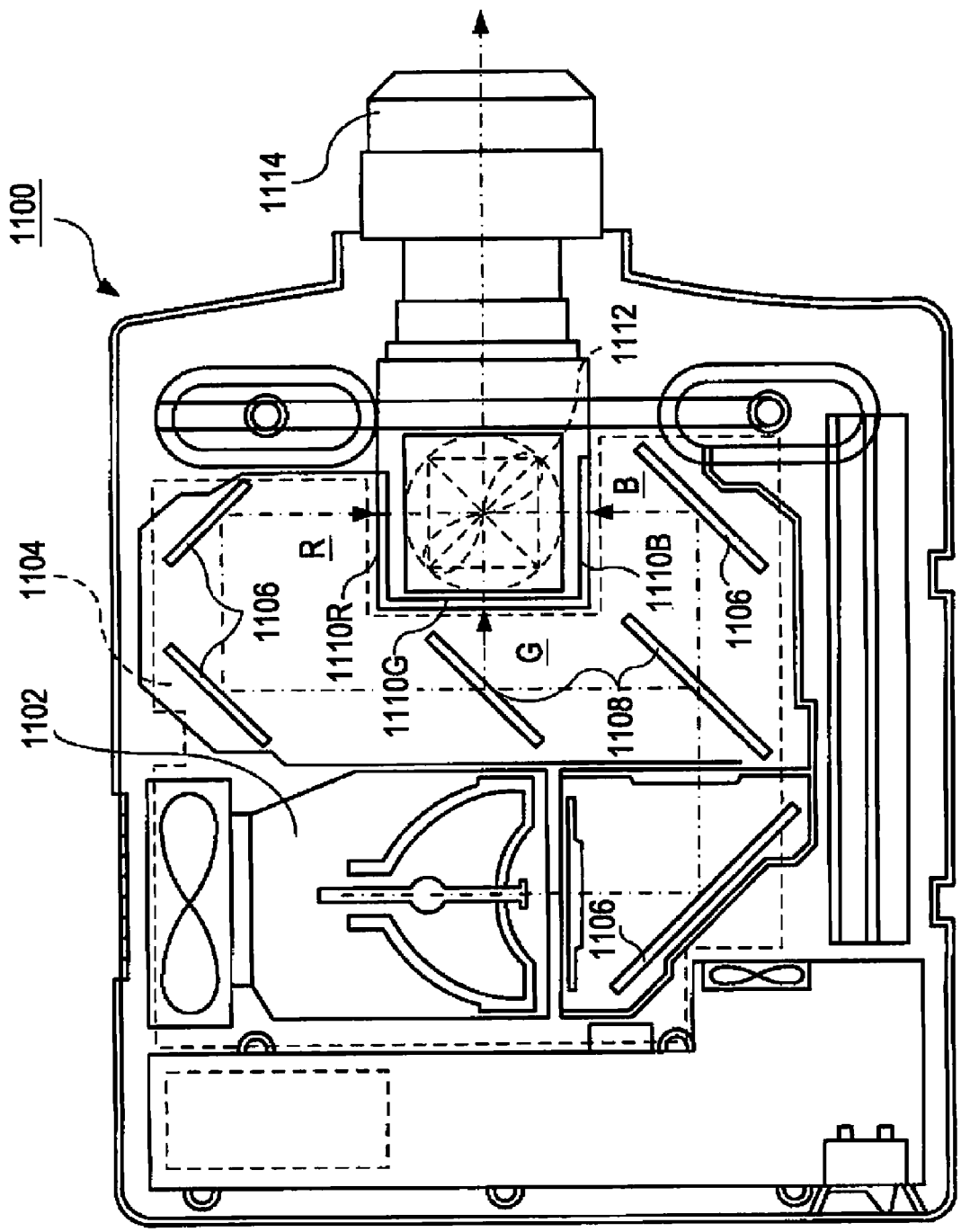

ELECTRO-OPTICAL DEVICE AND ELECTRONIC APPARATUS HAVING A LIGHT-SHIELDING FILM AT LEAST PARTIALLY OVERLAPPING WITH A TRANSISTOR IN PLAN VIEW AND HAVING A PLURALITY OF OPENINGS OVERLAPPING WITH THE TRANSISTOR

BACKGROUND

1. Technical Field

The present invention relates to an electro-optical device such as a liquid crystal device and an electronic apparatus including the electro-optical device, such as a liquid crystal projector.

2. Related Art

In this type of electro-optical device, a plurality of scan lines and data lines, which are arranged in a display area constituted by a plurality of pixels in all directions, and a plurality of pixel electrodes corresponding to intersections between the scan lines and the data lines are formed on a thin-film transistor (TFT) substrate. Since such an electro-optical device employs an active matrix driving method for driving TFTs, pixel switching TFTs are provided in correspondence with the pixels. Image signals supplied to the data lines are supplied to the pixel electrodes according to the switching operations of the pixel switching TFTs formed in the pixels such that an image is displayed in the display area. On the TFT array substrate on which the TFTs are formed, various types of peripheral circuits for controlling the plurality of pixels are formed in a peripheral area surrounding the display area. Such peripheral circuits include, for example, transistors such as TFTs.

For example, in JP-A-10-70277, a technology of adjusting the coupling capacitance between a gate electrode or a drain electrode of a transistor and a light-shielding film so as to reduce deterioration or variation of the transistor characteristics is disclosed.

In the case where this type of electro-optical device is used a light valve of a projector, a portion of light transmitting through the peripheral circuit in the peripheral area diagonally progresses to the display area and thus light leakage from the peripheral area may occur in the vicinity of the edge of the display area. Return light intruding into the peripheral area may be reflected from the peripheral circuit and mixed to the light emitted from the display area. As a result, a brightness pattern according to the reflection or the transmission in the peripheral circuit (for example, a brightness pattern according to an arrangement pattern of the plurality of transistors configuring the peripheral circuit) may be projected in the vicinity of the edge of the display image.

Accordingly, a light-shielding film may be provided on lower layer sides (or light emitting sides) of the transistors configuring the peripheral circuit which is provided in the vicinity of the edge of the display area in the peripheral area of the substrate. Thus, it is possible to reduce an adverse influence on the display image due to the reflection of the light in the peripheral circuit or the light leakage from the peripheral area.

However, the characteristics of the transistors may deteriorate by the light-shielding film provided on the lower layer sides of the transistors configuring the peripheral circuit.

SUMMARY

An advantage of some aspects of the invention is that it provides an electro-optical device, which is capable of preventing an adverse influence on a display image due to light leakage or light reflection in a peripheral area and displaying an image with high quality, without deteriorating the characteristics of transistors configuring a peripheral circuit, and an electronic apparatus including the electro-optical device.

According to a first aspect of the invention, there is provided an electro-optical device including: on a substrate, a plurality of pixel electrodes; a transistor provided in a peripheral area surrounding a pixel area in which the plurality of pixel electrodes are arranged; and a light-shielding film which is provided below the transistors so as to at least partially overlap with the transistors on the substrate in plan view and has a rectangular opening formed in a channel length direction of the transistor.

According to the first aspect of the invention, the plurality of pixel electrodes are made of a transparent material such as Indium Tin Oxide (ITO) and, for example, a plurality of data lines and a plurality of scan lines are arranged, for example, on the substrate in a matrix so as to intersect each other in the pixel area or the pixel array area (which is also called an image display area). The transistor is provided in the peripheral area surrounding the pixel area and configures, for example, at least a portion of a peripheral circuit such as a sampling circuit, a data line driving circuit or the like. The transistor is provided in a plurality along one side of the pixel area. At the time of the operation of the electro-optical device, for example, the potentials of the pixel electrodes are controlled on the basis of the image signal and the image is displayed in the pixel area in which the plurality of pixel electrodes are arranged. The electro-optical device emits display light according to incident light incident from a light source by projection in the pixel area. The electro-optical device is mounted in, for example, a projection display device as a light valve.

In the invention, in particular, the light-shielding film is provided below the transistor and at least partially overlaps with the transistor on the substrate in plan view. The light-shielding film has a rectangular or slit opening in the channel length direction of the transistor.

Typically, the light-shielding film is provided so as to overlap with a semiconductor layer configuring the transistor below the transistor. The light-shielding film is provided in each of the plurality of transistors provided along one side of the pixel area one by one and is provided in a plurality along one side. The opening is formed so as to extend in the channel length direction (that is, in the direction in which carriers flow in the transistor) of the transistor with a width of 1 μm or less. The opening is formed in a plurality at a predetermined interval in the channel width direction (that is, a direction crossing the channel length direction) of the transistor.

Accordingly, light leakage from the peripheral area and re-reflection of the return light from the transistor can be suppressed by the light-shielding film. Here, the return light indicates light which travels from a side, from which display light is emitted, to a side, to which incident light is made incident, such as light which is emitted from another electro-optical device by rear surface reflection of the substrate or a double-plate type projector and passes through a synthetic optical system in the electro-optical device. Accordingly, a brightness pattern according to the reflection or transmission of the light in the peripheral area, such as a brightness pattern according to an arrangement pattern of the plurality of transistors, can be suppressed from being projected to the vicinity of the edge of the display image. That is, the adverse influence on the display image due to the light leakage or the light reflection of the peripheral area can be suppressed.

Since the light-shielding film has the rectangular opening which extends in the channel length direction of the transistor, the deterioration of the characteristics of the sampling TFTs 71 which may occur in the case where the light-shielding film is solidly formed without the opening or have the opening which extends in the channel width direction of the transistor does not substantially occur. The deterioration of the characteristics of the transistor may occur due to capacitance coupling between the light-shielding film and the transistor, the mixture of impurities into the semiconductor layer due to the formation of the light-shielding film or a stress variation of the semiconductor layer.

According to the first aspect of the invention, it is possible to prevent an adverse influence on a display image due to light leakage or light reflection in the peripheral area without substantially deteriorating the characteristics of the transistor configuring the peripheral circuit and display a high-quality image.

In the first aspect of the invention, the opening may be formed in a plurality at a predetermined interval in a channel width direction of the transistors.

According to this aspect, the opening is formed in the light-shielding film in a plurality at the predetermined interval of 1 μm from a portion overlapping with one end of the transistor in the channel width direction to a portion overlapping with the other end of the transistor in the channel width direction. Accordingly, it is possible to prevent or suppress the deterioration of the characteristics of the transistor by the light-shielding film with more certainty.

In the first aspect of the invention, the opening may at least partially overlap with a channel area of the transistor on the substrate in plan view.

According to this aspect, the light-shielding film does not at least partially overlap with the channel area of the transistor. Accordingly, it is possible to suppress or prevent an adverse influence of the light-shielding film on the channel area of the transistor. Accordingly, it is possible to suppress or prevent the deterioration of the characteristics of the transistor by the light-shielding film with more certainty.

In the first aspect of the invention, the width of the opening may be 1 μm or less.

According to this aspect, the light can be substantially or completely blocked by the light-shielding film. Accordingly, it is possible to suppress or prevent the re-reflection of the return light from the transistor or the light leakage from the peripheral area with more certainty.

In the first aspect of the invention, the light-shielding film may include a first light-shielding portion having the opening; and a second light-shielding portion which is formed adjacent to the first light-shielding portion, is located farther from the pixel area than the first light-shielding portion and has a plane pattern different from that of the first light-shielding portion.

According to this aspect, it is possible to suppress the light leakage or the light reflection in a portion of the peripheral area relatively close to the pixel area by the first light-shielding portion having the opening. For example, by forming the second light-shielding portion to have a plane pattern having a portion overlapping with the transistor smaller than that of the first light-shielding portion, it is possible to suppress or prevent the deterioration of the characteristics of the transistor by the light-shielding film with more certainty. That is, by forming the second light-shielding portion in an area which is far from the pixel area so as to reduce a portion in which the light-shielding film and the transistor overlap with each other such that an adverse influence on a display image due to the light leakage or the light reflection does not substantially occur, it is possible to suppress or prevent the deterioration of the characteristics of the transistor with more certainty.

In the aspect of the invention in which the light-shielding film includes the first and second light-shielding portions, the second light-shielding portion may be formed so as not to at least partially overlap the transistor on the substrate in plan view.

In this case, it is possible to suppress or prevent the deterioration of the characteristics of the transistor by the light-shielding film with more certainty.

In the first aspect of the invention, the channel width of the transistor may be 5 μm or more.

According to this aspect, it is possible to suppress or prevent the deterioration of the characteristics of the transistor by the light-shielding film with more certainty.

In the first aspect of the invention, the channel width of the transistor may be larger than the channel length of the transistor.

According to this aspect, it is possible to suppress or prevent the deterioration of the characteristics of the transistor by the light-shielding film with more certainty.

In the first aspect of the invention, the electro-optical device may further include a plurality of scan lines and a plurality of data lines arranged in the pixel area; and an image signal line provided in the peripheral area so as to supply an image signal, wherein the transistor supplies the image signal supplied to the image signal line to the plurality of data lines according to a sampling signal and is formed as a plurality of sampling transistors arranged in correspondence with the plurality of data lines.

According to this aspect, the transistor is formed in a plurality so as to be arranged in an arrangement direction (that is, a direction in which the plurality of scan lines extend) of the plurality of data lines in the vicinity of the pixel area as a plurality of sampling transistors configuring the sampling circuit. Accordingly, the light-shielding film in which the rectangular opening is formed is formed in a plurality so as to be arranged in the arrangement direction of the plurality of data lines in the vicinity of the pixel area. Accordingly, it is possible to more efficiently suppress or prevent an adverse influence on a display image due to the light leakage or the light reflection in the peripheral area.

According to a second aspect of the invention, there is provided an electro-optical device comprising: on a substrate, a plurality of pixel electrodes; complementary transistors provided in a peripheral area surrounding a pixel area in which the plurality of pixel electrodes are arranged; and a light-shielding film which is interposed between the complementary transistors and the substrate so as to overlap with at least one of the complementary transistors on the substrate in plan view and has a rectangular opening formed in the channel length direction of the transistors.

According to the second aspect of the invention, it is possible to obtain the same advantage as the electro-optical device of the first aspect of the invention.

In the second aspect of the invention, the same aspects as the first electro-optical device of the invention can be employed.

According to another aspect of the invention, there is a provided an electronic apparatus including the electro-optical device (including various aspects).

Since the electronic apparatus of the invention includes the electro-optical device of the invention, various electronic apparatuses which can realize a high-quality image display, such as a projection display device, a television set, a cellular phone, an electronic organizer, a word processor, a view-finder-type or direct-view monitor type video tape recorder, a workstation, a videophone, a POS terminal, and a touch-panel-equipped device, can be realized. As the electronic apparatus of the invention, an electrophoretic device such as an electronic paper, an electron emission device (a field emission display and a conduction electron-emitter display), and a display device using the electrophoretic device and the electron emission device can be realized.

The operation and the other advantages of the invention are realized from the following best mode.

BRIEF DESCRIPTION OF THE DRAWINGS

The invention will be described with reference to the accompanying drawings, wherein like numbers reference like elements.

FIG. 15 is a plan view showing the configuration of a projector which is an example of an electronic apparatus using an electro-optical device.

DESCRIPTION OF EXEMPLARY EMBODIMENTS

Hereinafter, embodiments of the invention will be described with reference to the accompanying drawings. In the following embodiments, for example, a TFT active matrix driving type liquid crystal device having a driving circuit, which is an example of an electro-optical device of the invention, will be described.

First Embodiment

A liquid crystal device according to a first embodiment of the invention will be described with reference to FIGS. 1 to 6.

Figure 1:
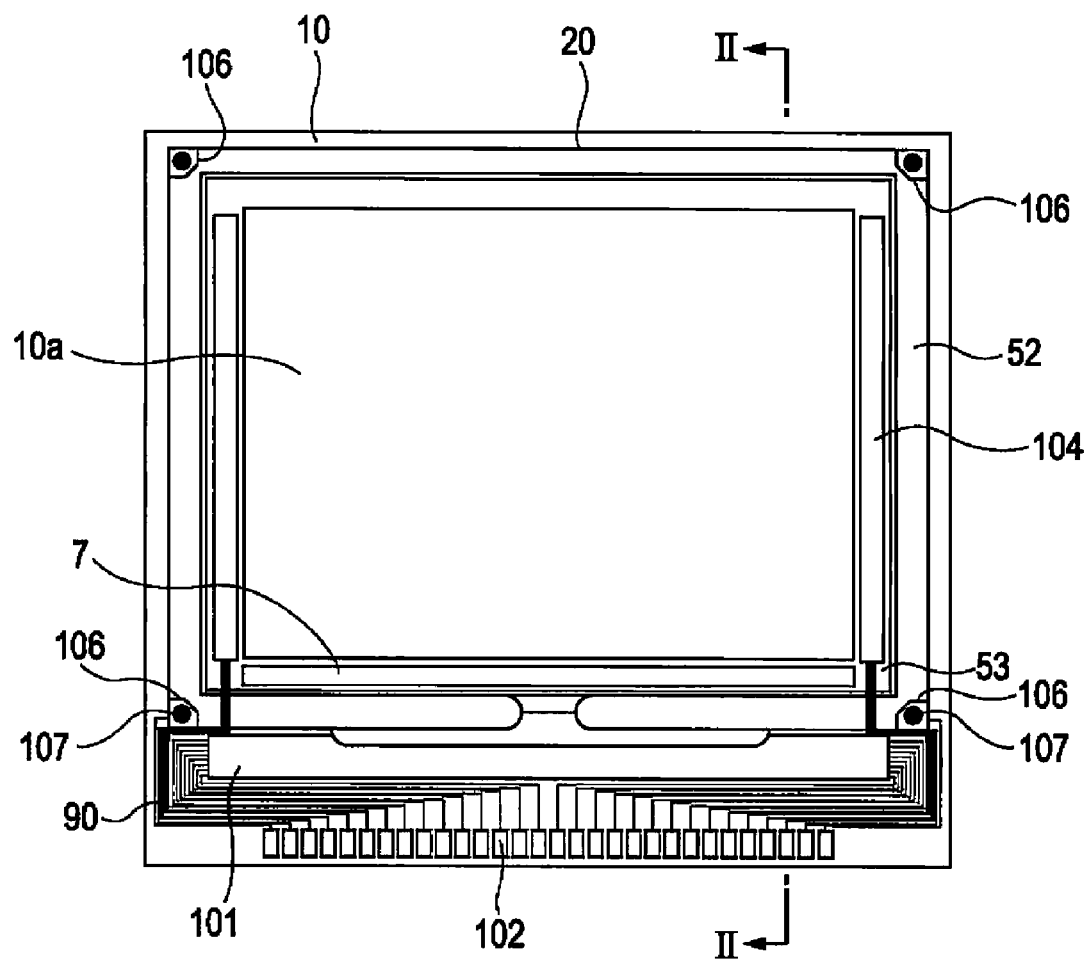
FIG. 1 is a plan view showing the overall configuration of a liquid crystal device according to a first embodiment of the invention.
Figure 2:
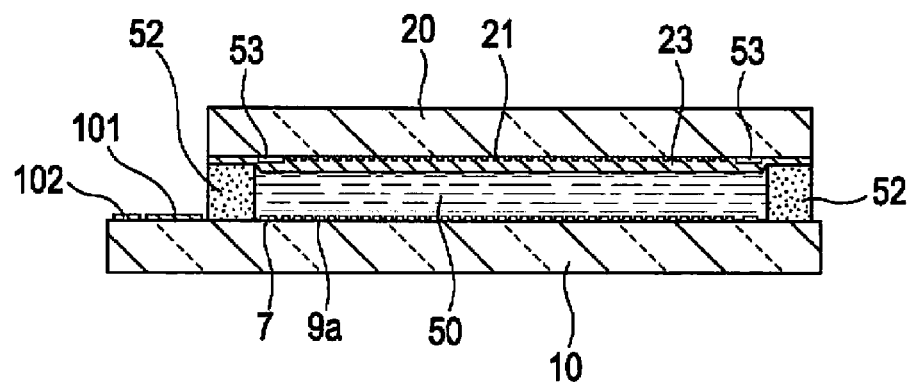
FIG. 2 is a cross-sectional view taken along line II-II of FIG. 1.

First, the overall configuration of the liquid crystal device according to the present embodiment will be described with reference to FIGS. 1 and 2. FIG. 1 is a plan view showing the overall configuration of the liquid crystal device according to the present embodiment. FIG. 2 is a cross-sectional view taken along line II-II of FIG. 1.

In FIGS. 1 and 2, in the liquid crystal device according to the present embodiment, a TFT array substrate 10 and a counter substrate 20 face each other. A liquid crystal layer 50 is filled between the TFT array substrate 10 and the counter substrate 20, and the TFT array substrate 10 and the counter substrate 20 are attached to each other by a seal material 52 provided in a seal area located at the periphery of an image display area 10a as an example of a pixel area according to the invention.

In FIG. 1, a frame light-shielding film 53 for defining a frame area of the image display area 10a is provided on the counter substrate 20 in parallel to the inside of the seal area in which the seal material 52 is arranged. In the present embodiment, a peripheral area is defined as an area located farther from the center of the TFT array substrate 10 than the frame area defined by the frame light-shielding film 53, including the frame area. That is, the peripheral area is an area excluding the image display area 10a on the TFT array substrate 10 and is set as an area which does not emit light.

In an area located on the outside of the seal area, in which the seal material 52 is arranged, of the peripheral area, a data line driving circuit 101 and external circuit connection terminals 102 are provided along one side of the TFT array substrate 10. A sampling circuit 7 is provided on the inside of the seal area along one side so as to be covered by the frame light-shielding film 53. A scan line driving circuit 104 is provided on the inside of the seal area along two sides adjacent to the above-described side so as to be covered by the frame light-shielding film 53. On the TFT array substrate 10, vertical conducting terminals 106 for connecting the both substrates by vertical conducting materials 107 are arranged in areas opposite to four corners of the counter substrate 20. Accordingly, the TFT array substrate 10 and the counter substrate 20 are electrically connected to each other.

On the TFT array substrate 10, drawing lines 90 for electrically connecting the external circuit connection terminals 102, the data line driving circuit 101, the scan line driving circuit 104 and the vertical conducting terminals 106 are formed.

In FIG. 2, a lamination structure made of lines such as pixel switching TFTs, scan lines or data lines is formed on the TFT array substrate 10. In the image display area 10a, pixel electrodes 9a made of a transparent material such as ITO are provided on the lines such as the pixel switching TFTs, the scan lines or the data lines in a matrix. An alignment film is formed on the pixel electrodes 9a. A light-shielding film 23 is formed on a surface of the counter substrate 20 opposite to the TFT array substrate 10. The light-shielding film 23 is formed of, for example, a light-shielding metal film and is patterned on the counter substrate 20 in a lattice shape in the image display area 10a. A counter electrode 21 made of a transparent material such as ITO is solidly formed on the light-shielding film 23 in opposite to the plurality of pixel electrodes 9a. An alignment film is formed on the counter electrode 21. The liquid crystal layer 50 is made of one type or several types of nematic liquid crystal and a predetermined alignment state is obtained between the pair of alignment films.

In the present embodiment, it is assumed that incident light incident from the counter substrate 20 to the liquid crystal layer 50 in the image display area 10a is emitted from the TFT array substrate 10 as display light.

Although not shown, in addition to the data line driving circuit 101 and the scan line driving circuit 104, a test circuit for testing the quality or defect of the liquid crystal device during manufacture or before shipment or a test pattern may be formed on the TFT array substrate 10.

Figure 3:
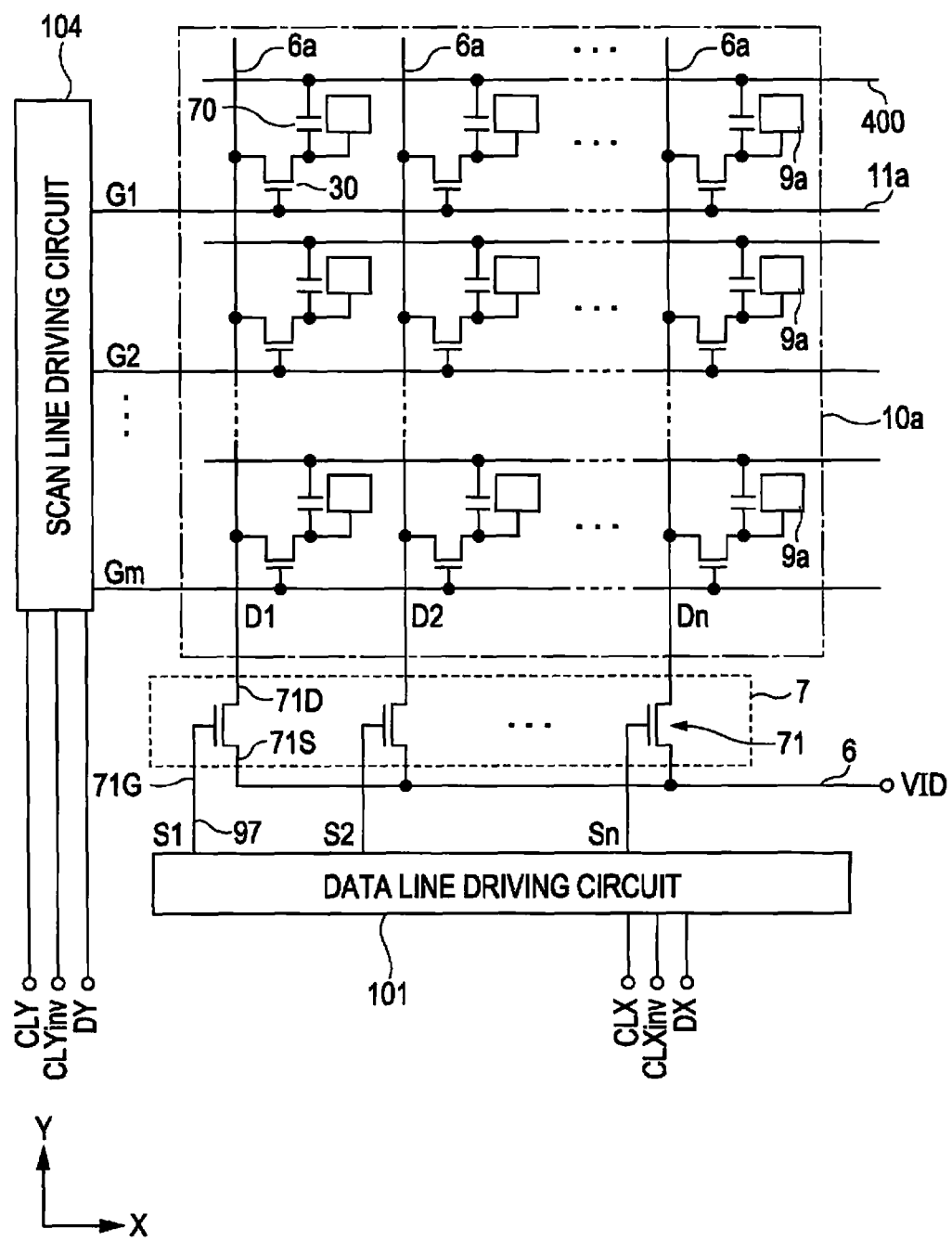
FIG. 3 is a block diagram showing the electrical configuration of the liquid crystal device according to the first embodiment.

Next, the electrical configuration of the liquid crystal device according to the present embodiment will be described with reference to FIG. 3. FIG. 3 is a block diagram showing the electrical configuration of the liquid crystal device according to the present embodiment.

As shown in FIG. 3, in the liquid crystal device according to the present embodiment, a peripheral circuit including the scan line driving circuit 104, the data line driving circuit 101 and the sampling circuit 7 and an image signal line 6 are provided on the TFT array substrate 10 in the peripheral area.

A Y clock signal CLY, an inverted Y clock signal CLYinv and a Y start pulse DY are supplied to the scan line driving circuit 104. When the Y start pulse DY is received, the scan line driving circuit 104 sequentially generates and outputs scan signals Gi (i=1, ..., and m) at timings based on the Y clock signal CLY and the inverted Y clock signal CLYinv.

An X clock signal CLX, an inverted X clock signal CLXinv and an X start pulse DX are supplied to the data line driving circuit 101. When the X start pulse DX is received, the data line driving circuit 101 sequentially generates and outputs sampling signals Si (i=1, 2, ..., and n) at timings based on the X clock signal CLX and the inverted X clock signal XCLinv.

The sampling circuit 7 has a plurality of sampling TFTs 71 provided in correspondence with the data lines 6a. The sampling TFTs 71 are an example of the "transistor" according to the invention and are, for example, one-channel type TFTs such as P-channel type or N-channel type TFTs. The sampling TFTs 71 may be formed of complementary TFTs.

Source lines 71S of the sampling TFTs 71 are electrically connected to the image signal line 6, gate lines 71G of the sampling TFTs 71 are electrically connected to sampling signal lines 97, and drain lines 71D of the sampling TFTs 71 are electrically connected to the data lines 6a. When an image signal VID is received via the image signal line 6 and sampling signals Si (i=1, 2, ..., and n) are received from the data line driving circuit 101 via the sampling signal lines 97, the sampling TFTs 71 sample the image signal VID and applies data signals Di (i=1, 2, ..., and n) to the data lines 6a.

As shown in FIG. 3, in the plurality of pixels which are formed in a matrix configuring the image display area 10a of the TFT array substrate 10, pixel electrodes 9a and pixel switching TFTs 30 for controlling the switching of the pixel electrodes 9a are formed, and the data lines 6a to which the data signals Di are supplied are electrically connected to the sources of the pixel switching TFTs 30. The data signals Di written to the data lines 6a may be line-sequentially supplied in this order or supplied to a group of a plurality of adjacent data lines. The scan lines 11a are electrically connected to gates of the pixel switching TFTs 30. Scan signals G1, G2, ..., and Gm are line-sequentially applied from the scan line driving circuit 104 to the scan lines 11a at predetermined timings in this order. Although, in the present embodiment, the scan signals G1, G2, ..., and Gm are line-sequentially applied to the scan lines 11a for simplification of description, the order of applying the scan signals Gi (i=1, 2, ..., and m) to the scan lines 11a may be changed. The pixel electrodes 9a are electrically connected to the drains of the pixel switching TFTs 30, and the pixel switching TFTs 30 which are the switching elements are closed only for predetermined periods such that the data signals Di supplied from the data lines 6a are written at predetermined timings.

The data signals Di (i=1, 2, ..., and n) having a predetermined level, which are written to the liquid crystal via the pixel electrodes 9a, are held between the pixel electrodes and the counter electrode 21 (see FIG. 2) formed on the counter substrate 20 (see FIG. 2) for a predetermined period. The liquid crystal changes the alignment or order of a set of molecules by the level of the applied voltage so as to modulate the light, thereby realizing a gradation display. The transmissivity of the incident light is decreased according to the applied voltage in pixel units if a normally white mode and the transmissivity of the incident light is increased according to the applied voltage in pixel units in a normally black mode, such that the light having contrast according to the image signal is emitted from the liquid crystal device.

In order to prevent the held image signal from being leaked, storage capacitors 70 are provided in parallel to the liquid crystal capacitance between the pixel electrodes 9a and the counter electrode 21. One electrode of each of the storage capacitors 70 is electrically connected to the drain of each of the pixel switching TFTs 30 in parallel to each of the pixel electrodes 9a and the other electrode thereof is electrically connected to each of capacitance lines 400 having a fixed potential so as to obtain a constant potential.

Figure 4:
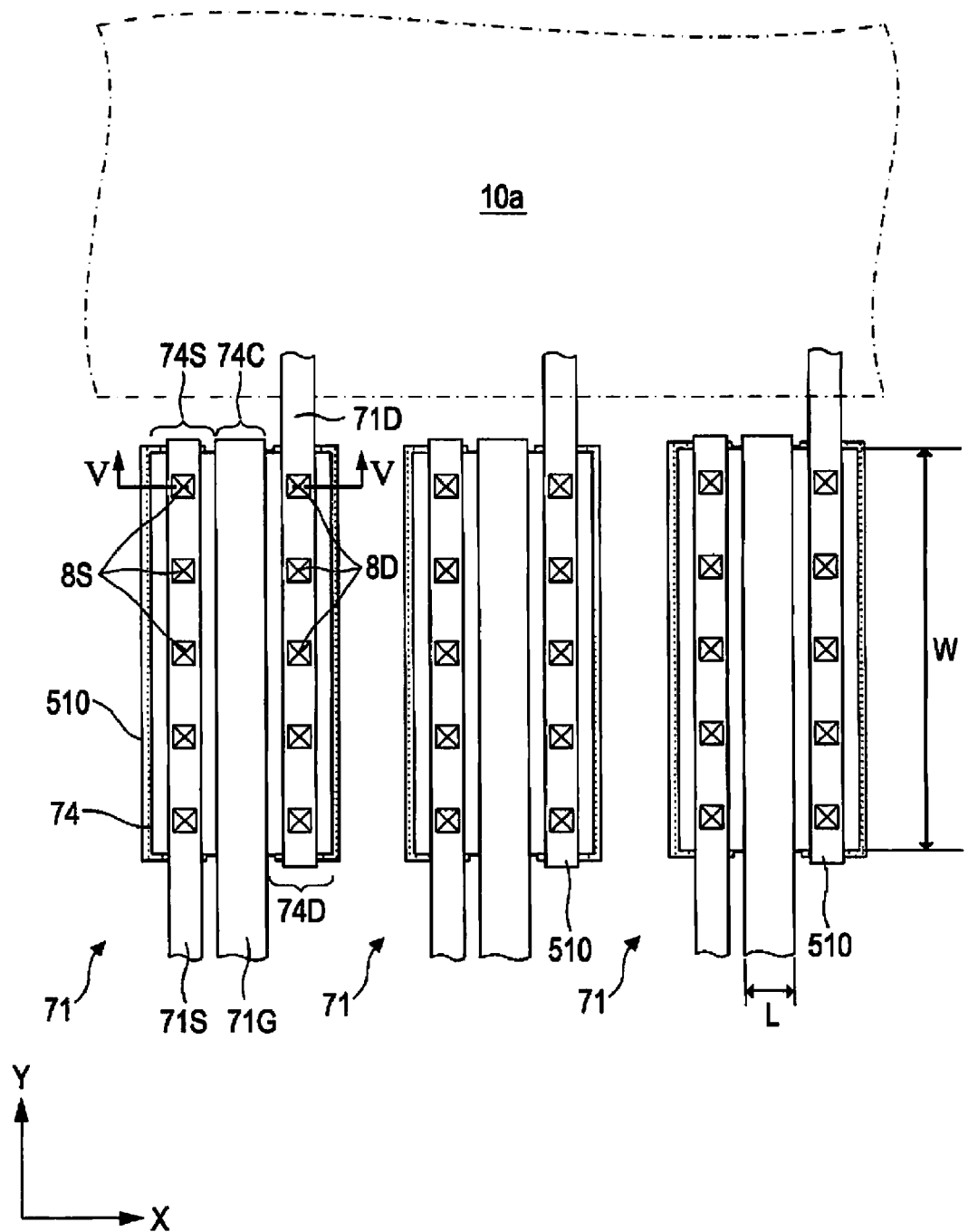
FIG. 4 is a plan view showing the configuration of a sampling TFT.
Figure 5:
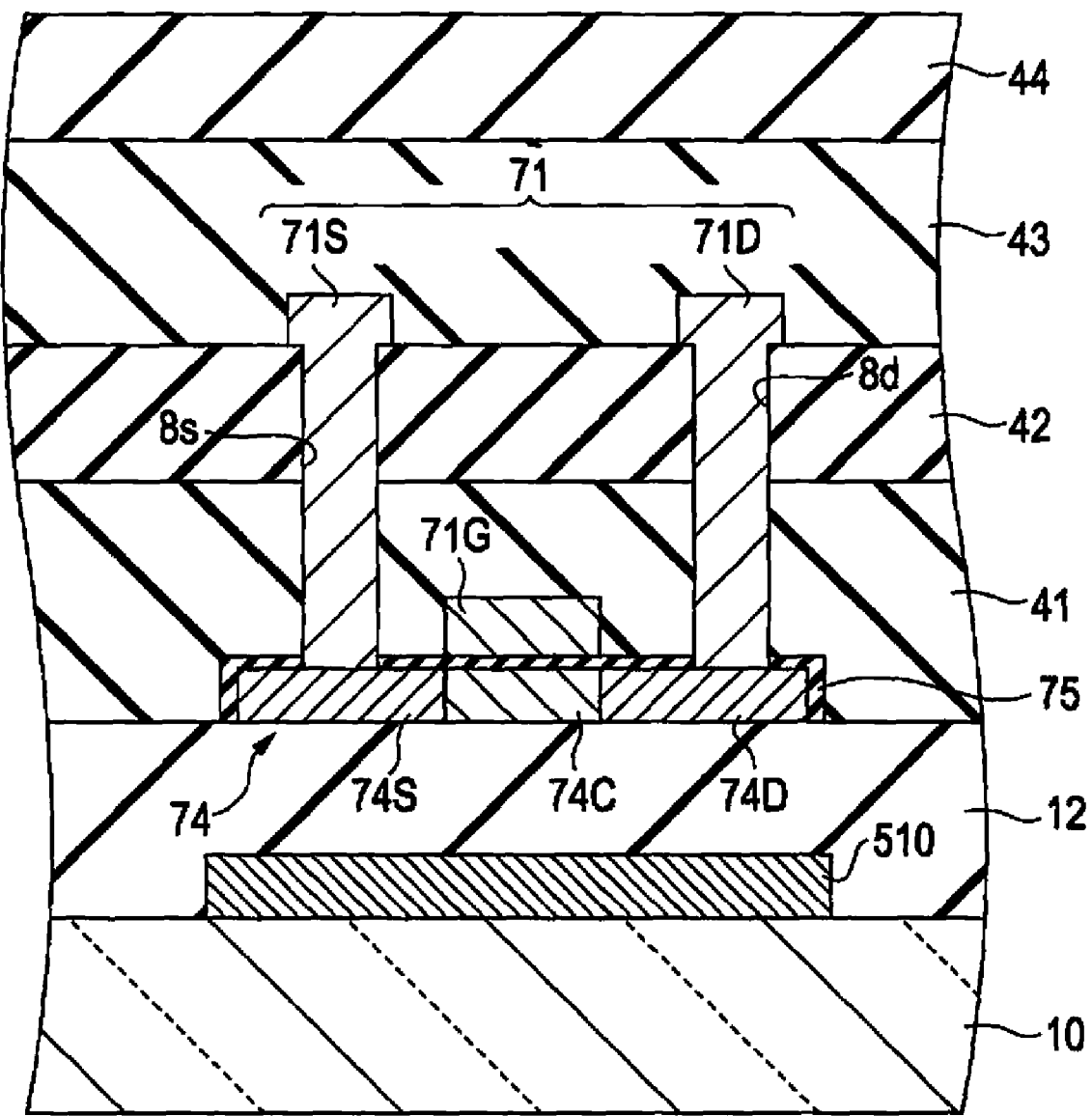
FIG. 5 is a cross-sectional view taken along line V-V of FIG. 4.
Figure 6:
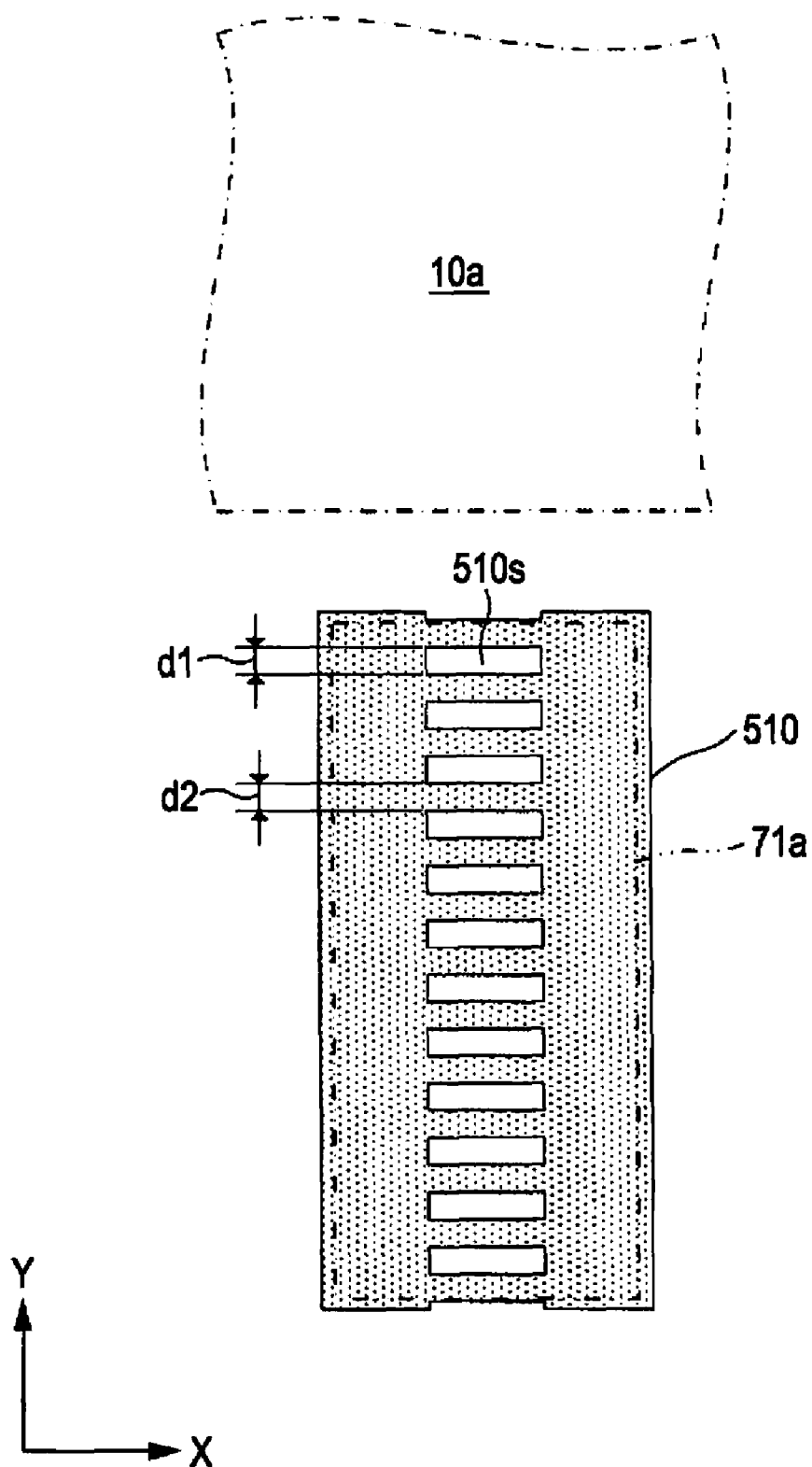
FIG. 6 is a plan view showing the configuration of each of light-shielding films provided in correspondence with the sampling TFTs.

Next, the detailed configuration of each of the sampling TFTs according to the present embodiment will be described with reference to FIGS. 4 to 6, together with the configuration of the light-shielding film provided in correspondence with the sampling TFTs. FIG. 4 is a plan view showing the configuration of each of the sampling TFTs. FIG. 5 is a cross-sectional view taken along line V-V of FIG. 4. FIG. 6 is a plan view showing the configuration of a light-shielding film provided in correspondence with each of the sampling TFTs. In FIG. 5, the scale of each layer or each element is differentiated from each other in order that each layer or each element has a size capable of being identified in the view.

In FIGS. 4 and 5, the sampling TFTs 71 are formed on an underlying insulating film 12 provided on the TFT array substrate 10. Each of the sampling TFTs 71 includes a semiconductor layer 74, the source line 71S, the drain line 71D, the gate line 71G and a gate insulating film 75.

The semiconductor layer 74 has a channel area 74c, a source area 74S and a drain area 74D in which a channel is formed by an electric field from the gate line 71G. An area adjacent to the channel area 74C may be a lightly doped drain (LDD) area.

In the present embodiment, the sampling TFTs 71 are formed such that a channel length (that is, a distance between the source area 74S and the drain area 74D or a length of the channel area 74C in an X direction) L becomes a predetermined length, for example, in a range of 3 to 5 μm and a channel width (a length of the channel area in a Y direction) W becomes a predetermined length, for example, in a range of 50 μm to 600 μm. Accordingly, the channel width W of each of the sampling TFTs 71 is large than the channel length L of each of the sampling TFTs 71.

The source line 71S is made of a metal film such as aluminum and is formed on the semiconductor layer 74 with interlayer insulating films 41 and 42 interposed therebetween. The source line 71S is electrically connected to the source area 74S via a contact hole 8S penetrating through the interlayer insulating films 41 and 42. The source line 71S extends in the extension direction (that is, the Y direction) of the data lines 6a. The source line 71S is electrically connected to the image signal line 6 via a contact hole and a relay line (not shown) (see FIG. 3).

The drain line 71D is formed by the same film as the source line 71S. That is, the drain line is made of a metal film such as aluminum and is formed on the semiconductor layer 74 with the interlayer insulating films 41 and 42 interposed therebetween. The same film indicates a film obtained by simultaneously patterning a thin film made of the same conductive material. The data line 71D is electrically connected to the data area 74D via a contact hole 8D penetrating through the interlayer insulating films 41 and 42. The drain line 71D extends in the extension direction (that is, the Y direction) of the data lines 6a. The drain line 71D is electrically connected to the image signal line 6 via a contact hole and a relay line (not shown) (see FIG. 3).

The gate line 71G is formed of, for example, a conductive polysilicon film and is formed on the semiconductor layer 74 with the gate insulating film 75 interposed therebetween. The gate line 71G includes a gate electrode overlapping with the channel area 74 of the semiconductor layer 74 with the gate insulating film 75 interposed therebetween and extends in the extension direction (that is, the Y direction) of the data line 6a. The gate line 71G is electrically connected to each of the sampling signal lines 97 via a contact hole and a relay line (not shown) (see FIG. 3).

Interlayer insulating films 43 and 44 are sequentially laminated on the source line 71S and the drain line 71D.

In FIGS. 4 and 5, in the present embodiment, in particular, the light-shielding films 510 are provided in correspondence with the sampling TFTs 71. The light-shielding films 510 are provided below the sampling TFTs 71 with the underlying insulating film 12 interposed therebetween and are formed so as to overlap with the sampling TFTs 71 on the TFT array substrate 10 in plan view. The plurality of light-shielding films 510 are provided in one-to-one correspondence with the plurality of sampling TFTs 71 in the vicinity of the image display area 10a in the X direction. The light-shielding films 510 are made of a light-shielding conductive material such as a metal element, an alloy, metal silicide, polysilicide or a lamination thereof, including at least one of high-melting-point metal such as titanium (Ti), chrome (Cr), tungsten (W), tantalum (Ta) and molybdenum (Mo).

As shown in FIG. 6, each of the light-shielding films 510 is formed so as to overlap with an area 71a in which each of the sampling TFTs 71 is formed and a plurality of slits 510s are formed in each of the light-shielding films 510. The slits 510s are an example of an "opening" according to the invention and are opened in the light-shielding films 510 so as to extend in the channel length direction (that is, the X direction) of the sampling TFTs 71.

Each of the plurality of slits 510s is formed in each of the light-shielding films 510 so as to extend in the channel length direction (that is, the X direction) of the sampling TFTs 71 with a predetermined width d1 of 1 μm or less. The plurality of slits 510s are formed so as to be arranged at a predetermined interval d2 of 1 μm in the channel width direction (that is, the Y direction) of the sampling TFTs 71. In FIG. 6, the scale of each of the light-shielding layers 510 is differentiated in order that each of the slits 510s has a size capable of being identified in the view.

Accordingly, light leakage from the peripheral area surrounding the image display area 10a and re-reflection of the return light from the sampling TFTs 71 can be suppressed by the light-shielding films 510. That is, by the plurality of light-shielding films 510, the light leakage from the peripheral area in the vicinity of the edge of the side of the image display area 10a in which the sampling TFTs 71 are formed can be suppressed or the reflection of the return light (light from the lower side to the upper side of FIG. 5) such as light, which is emitted from another liquid crystal device by the rear surface reflection of the TFT array substrate 10 or a double-plate type projector and passes through a synthetic optical system, by the sampling TFTs 71 can be suppressed. Accordingly, a brightness pattern according to the reflection or transmission of the light in the peripheral area, such as a brightness pattern according to an arrangement pattern of the plurality of sampling TFTs 71, can be suppressed from being projected to the vicinity of the edge of the image display area 10a. That is, the adverse influence on the display image due to the light leakage or the light reflection of the peripheral area can be suppressed.

In FIG. 6, in the present embodiment, in particular, the width d1 of each of the slit 510s is 1 μm or less. Accordingly, the light can be substantially or completely blocked by the light-shielding films 510. Accordingly, the light leakage from the peripheral area or the re-reflection of the return light due to the transistor can be suppressed or prevented with more certainty.

Since the light-shielding films 510 have the slits 510s which extend in the channel length direction (that is, the X direction) of the sampling TFTs 71, the deterioration of the characteristics of the sampling TFTs 71 which may occur in the case where the light-shielding films 510 are solidly formed without the slit or have slits which extend in the channel width direction (that is, the Y direction) of the sampling TFTs 71, that is, the deterioration of the characteristics of the sampling TFTs 71 which may occur due to capacitance coupling between the light-shielding films 510 and the sampling TFTs 71 or the mixture of impurities into the semiconductor layer 74 due to the formation of the light-shielding films 510, does not substantially occur.

In addition, in the present embodiment, in particular, the slits 510s are formed so as to overlap with the channel area 74C of each of the sampling TFTs 71. Accordingly, the light-shielding films 510 do not overlap with the channel areas 74C of the sampling TFTs 71 in an area in which the slits 510s are formed. Accordingly, the adverse influence of the light shielding films 510 on the channel areas 74C of the sampling TFTs 71 can be suppressed. Accordingly, it is possible to suppress the deterioration of the characteristics of the sampling TFTs 71 by the light-shielding films 510 with more certainty.

In addition, in the present embodiment, in particular, the plurality of slits 510s are formed to be arranged at a predetermined interval d2 from a portion of the light-shielding films 510 overlapping with one ends of the sampling TFTs 71 in the channel width direction (that is, the Y direction) to a portion of the light-shielding films overlapping with the other ends of the sampling TFTs 71 in the channel width direction. Accordingly, it is possible to suppress the deterioration of the characteristics of the sampling TFTs 71 by the light-shielding films 510 with more certainty.

In FIG. 4, in the present embodiment, in particular, since the channel width W of the sampling TFTs 71 is a predetermined length, for example, in a range of 50 μm to 600 μm and is larger than the channel length L of the sampling TFTs 71 which is a predetermined length, for example, in a range of 3 to 5 μm, it is possible to suppress the deterioration of the characteristics of the sampling TFTs 71 by the light-shielding films 510 with more certainty.

As a result, according to the liquid crystal device according to the present embodiment, it is possible to prevent an adverse influence on a display image due to light leakage or light reflection in the peripheral area without substantially deteriorating the characteristics of the sampling TFTs 71 configuring the sampling circuit 7 and display a high-quality image.

Second Embodiment

Figure 7:
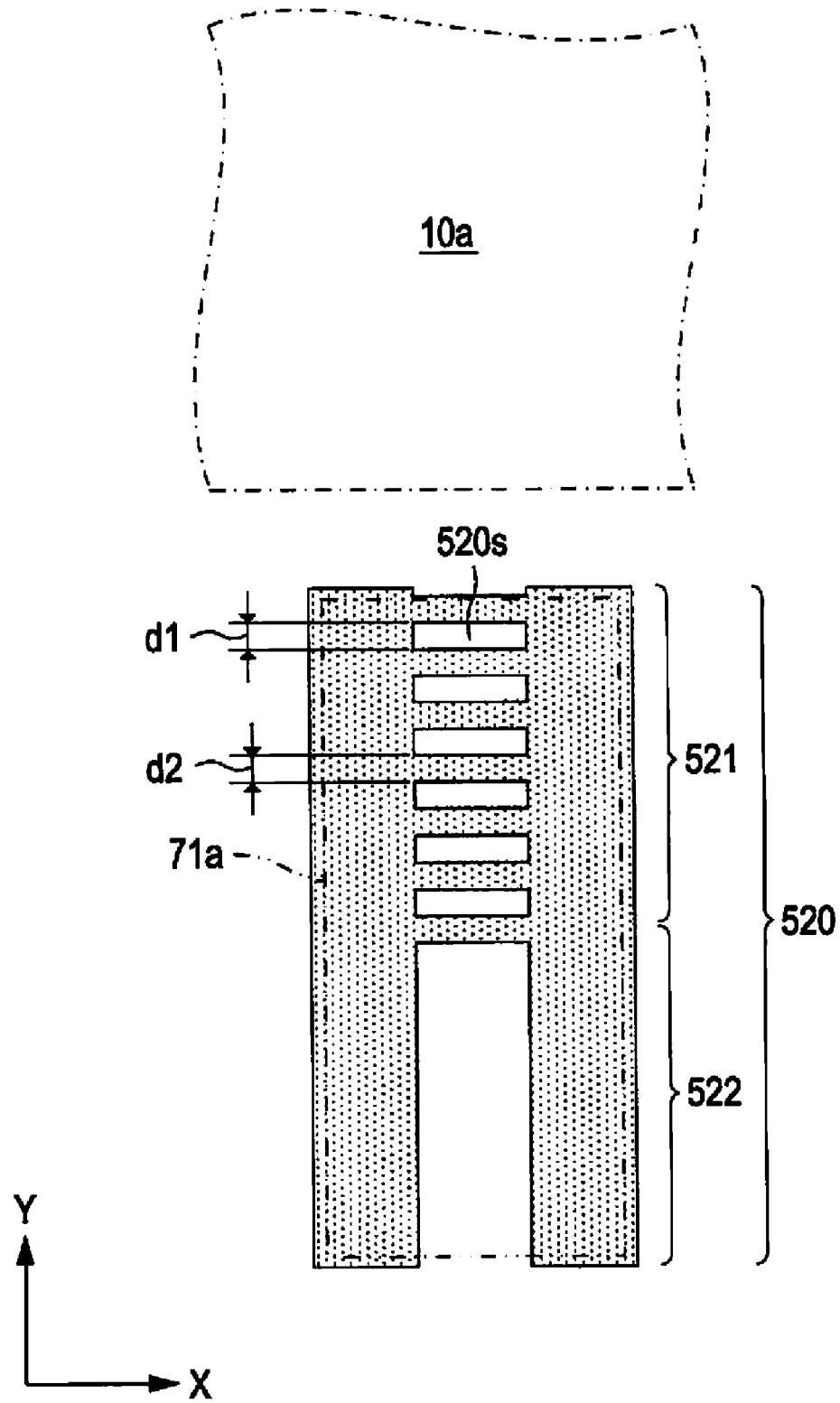
FIG. 7 is a plan view showing the same configuration of FIG. 6 according to a second embodiment of the invention.

A liquid crystal device according to a second embodiment of the invention will be described with reference to FIG. 7. FIG. 7 is a plan view showing the same configuration of FIG. 6 according to a second embodiment of the invention. In FIG. 7, the same components as the first embodiment shown in FIGS. 1 to 6 are denoted by the same reference numerals and thus the description thereof will be properly omitted.

In FIG. 7, the liquid crystal device according to the second embodiment is different from that of the first embodiment in that light-shielding films 520 are included instead of the light-shielding films 510 of the first embodiment and is similar to that of the first embodiment in the other configuration.

As shown in FIG. 7, in the present embodiment, in particular, each of the light-shielding films 520 includes a first light-shielding portion 521 having a plurality of slits 520s and a second light-shielding portion 522 which is formed adjacent to the first light-shielding portion 521 and is located farther from the image display area 10a than the first light shielding portion 521 in the channel width direction (that is, the Y direction) of the sampling TFTs 71.

The plurality of slits 520s formed in the first light-shielding portion 521 are opened in the light-shielding films 520, similar to the slits 510s of the first embodiment. The plurality of slits 520s are formed in the light-shielding films 520 so as to extend in the channel length direction of the sampling TFTs 71 with a predetermined width d1 of, for example, 1 μm or less. The plurality of slits 520s are formed at a predetermined interval d2 of, for example, 1 μm in the channel width direction of the sampling TFTs 71.

The second light-shielding portion 522 has a plane pattern different from that of the first light-shielding portion 521 and more particularly a plane pattern which overlaps with the source area 74S and the drain area 74D of each of the sampling TFTs 71 and does not overlap with the channel area 74C of each of the sampling TFTs 71. In other words, the second light-shielding portion 522 is formed with a plane pattern in which a portion overlapping with each of the sampling TFTs 71 is smaller than that of the first light-shielding portion 521.

Accordingly, it is possible to suppress the deterioration of the characteristics of the sampling TFTs 71 by the light-shielding films 520 with more certainty.

That is, in the present embodiment, in particular, in the area 71a in which the sampling TFTs 71 are formed, since the first light-shielding portion 521 having the slits 520s are formed in an area which is close to the image display area 10a to have an adverse influence on a display image due to light leakage or light reflection, an adverse influence on a display image in the vicinity of the edge of the image display area 10a due to the light leakage or the light reflection in the peripheral area can be suppressed and the deterioration of the characteristics of the sampling TFTs 71 can be suppressed. In addition, in the area 71a in which the sampling TFTs 71 are formed, since the second light-shielding portion 522 having the plane pattern in which the portion overlapping with each of the sampling TFTs 71 is smaller than the portion of the first light-shielding portion 521 overlapping with each of the sampling TFTs 71 is formed in an area which is far from the image display area 10a not to substantially have an adverse influence on the display image due to the light leakage or the light reflection, the deterioration of the characteristics of the sampling TFTs 71 can be suppressed with more certainty.

Figure 8:
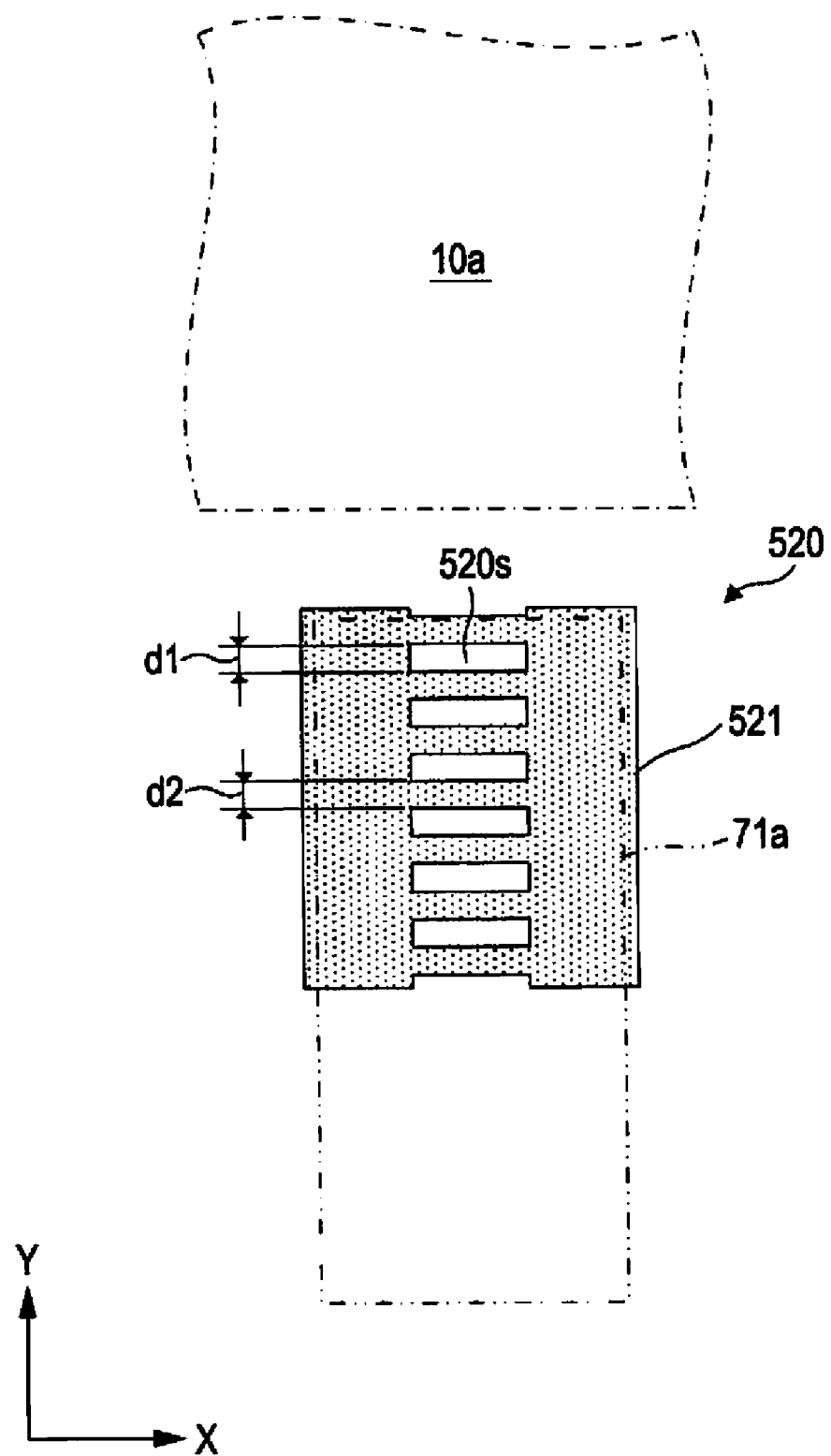
FIG. 8 is a plan view showing the same configuration of FIG. 6 in a modified example of the second embodiment.

FIG. 8 is a plan view showing the same configuration of FIG. 6 in a modified example of the second embodiment.

As shown in the modified example of FIG. 8, each of the light-shielding films 520 may have only the first light-shielding portion 521, that is, may not have the second light-shielding portion 522. In other words, in the peripheral area, each of the light-shielding films 520 may be formed not to overlap with each of the sampling TFTs 71 in an area which is far from the image display area 10a not to substantially have an adverse influence on the display image due to the light leakage or the light reflection.

In this case, it is possible to suppress the deterioration of the characteristics of the sampling TFTs 71 by the light-shielding films 520 with more certainty.

Third Embodiment

A liquid crystal device according to a third embodiment of the invention will be described with reference to FIGS. 9 to 12.

The liquid crystal device according to the third embodiment is different from that of the first embodiment in that light-shielding films 530 (see FIGS. 11 and 12) are formed on the TFT array substrate 10 in an area in which the scan line driving circuit 104 is formed and is similar to that of the first embodiment in the other configuration.

First, the electrical configuration of the scan line driving circuit of the liquid crystal device according to the present embodiment will be described in detail with reference to FIGS. 9 and 10.

Figure 9:
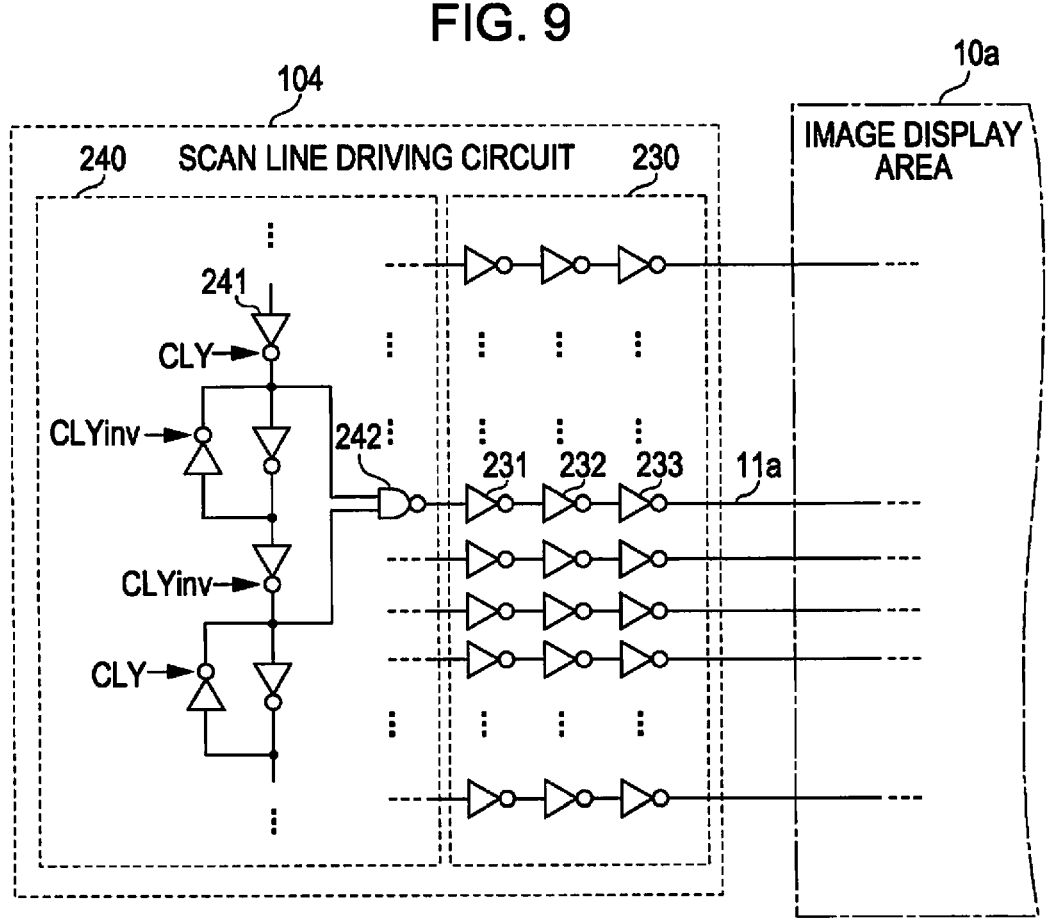
FIG. 9 is a circuit diagram showing the electrical configuration of a scan line driving circuit.

FIG. 9 is a circuit diagram showing the electrical configuration of the scan line driving circuit. FIG. 10 is a circuit diagram showing the overall configuration of an output buffer. In FIGS. 9, 10, 11 and 12, the same components as the first embodiment shown in FIGS. 1 to 6 are denoted by the same reference numerals and thus the description will be properly omitted.

In FIG. 9, the scan line driving circuit 104 includes a shift register 240 and an output buffer 230.

The shift register 240 includes a plurality of inverters 241 and a NAND circuit 242 and sequentially outputs and transmits a transmission signal to the output buffer 230 at a timing for supplying the image signal to the pixel electrodes 9a of the pixels, on the basis of the Y clock signal CLY and the inverted Y clock signal CLYinv.

The output buffer 230 is electrically connected to inverters 231, 232 and 233 in series. An input terminal of the output buffer 230 is electrically connected to an output terminal of the shift register 240 and the transmission signal from the shift register 240 is input to the input terminal of the output buffer 230. The output buffer 230 applies driving performance to the transmission signal transmitted from the shift register 240. The transmission signal having the driving performance (that is, current supplying performance) is supplied from the scan line driving circuit 104 to the pixel switching TFTs 30 via the scan lines 11a as the scan signals.

Since the output buffer 230 includes the plural stages of inverters 231, 232 and 233, the transmission signal can be output as the scan signal after the driving performance is increased, the waveform is shaped and the timing is adjusted.

Figure 10:
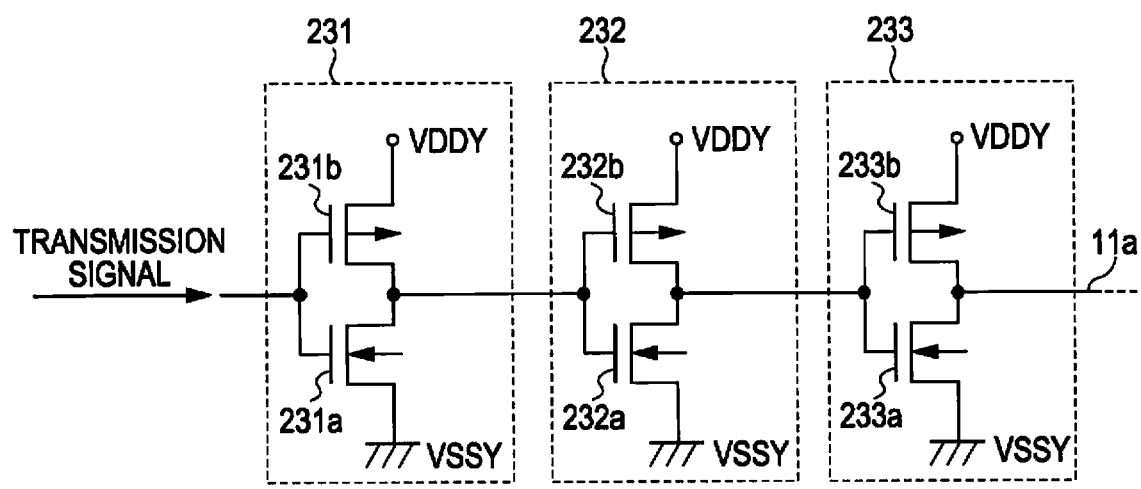
FIG. 10 is a circuit diagram showing the overall configuration of an output buffer.

As shown in FIG. 10 in detail, the inverter 231 includes complementary transistors, that is, a TFT 231a which is an N-channel type TFT and a TFT 231b which is a P-channel type TFT. Similarly, the inverter 232 includes a TFT 232a which is an N-channel type TFT and a TFT 232b which is a P-channel type TFT and the inverter 233 includes a TFT 233a which is an N-channel type TFT and a TFT 233b which is a P-channel type TFT. The input terminal of the output buffer 230 is electrically connected to the gates of the TFT 231a and the TFT 231b. The output terminal of the output buffer 230 is electrically connected to the drains of the TFT 233a and the TFT 233b.

The inverters 231, 232 and 233 are driven by a high-potential voltage VDDY and a low-potential voltage VSSY for a scan line driving circuit. Accordingly, the voltage of the transmission signal transitions between the potential of the high-potential voltage VDDY for the scan line driving circuit and the potential of the low-potential voltage VSSY for the scan line driving circuit, the driving performance is gradually increased, and the scan signals G1, . . . , and Gm are output.

Next, among the plural stages of inverters configuring the output buffer, the detailed configuration of the inverter located a final stage of the output side to the scan line will be described with reference to FIGS. 11 and 12.

Figure 11:
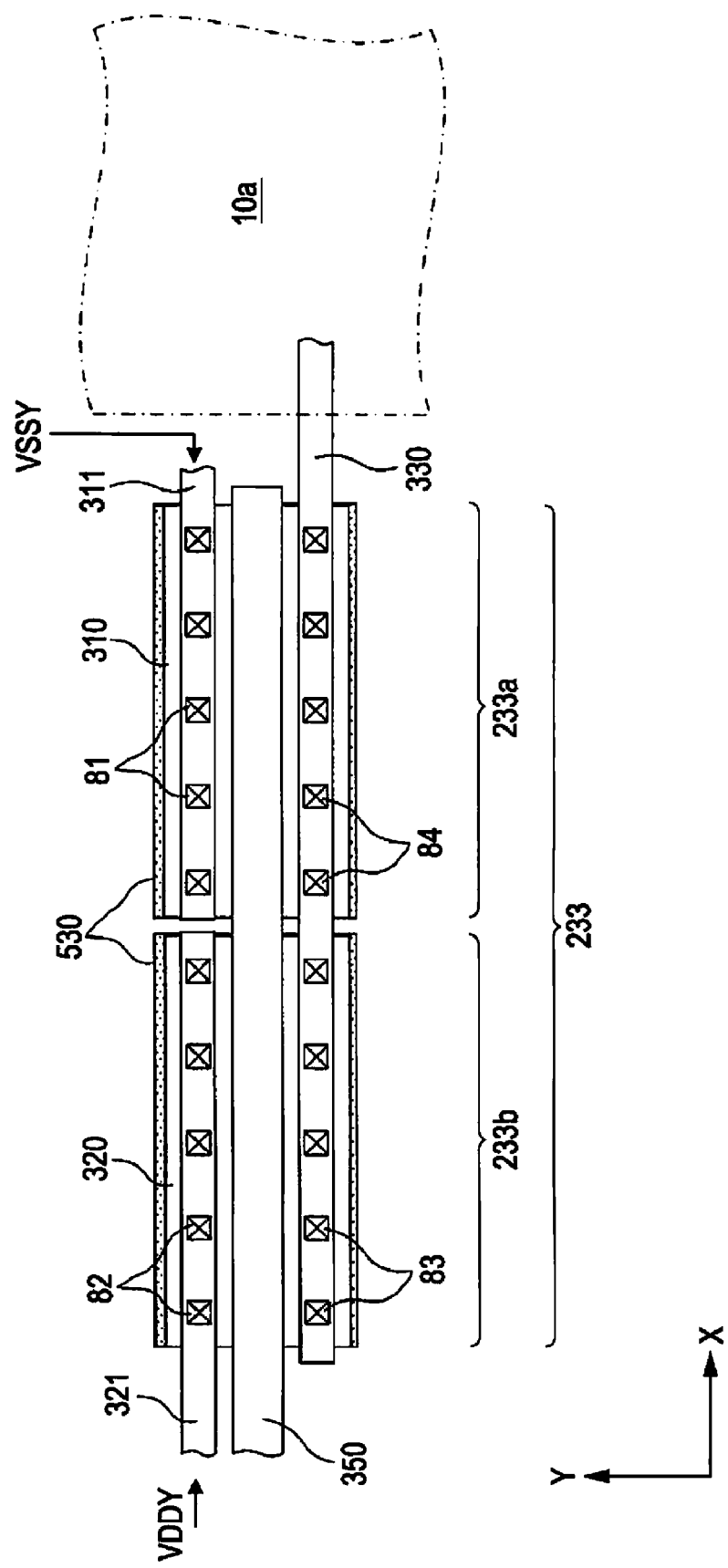
FIG. 11 is a plan view showing the detailed configuration of an inverter located at a final stage of an output side to a scan line among plural stages of inverters configuring an output buffer.

FIG. 11 is a plan view showing the detailed configuration of the inverter located at the final stage of the output side to the scan line among the plural stages of inverters configuring the output buffer. FIG. 12 is a plan view showing the configuration of the light-shielding film provided in correspondence with the inverter located at the final stage of the output side to the scan line among the plural stages of inverters configuring the output buffer.

In FIG. 11, the inverter 233 includes the complementary transistors, that is, the TFT 233a which is the N-channel type TFT and the TFT 233b which is the P-channel type TFT.

The TFT 233a has a semiconductor layer 310. The semiconductor layer 310 is formed on the underlying insulating film 12 similar to the semiconductor layer 74 which is described with FIGS. 4 and 5. The semiconductor layer 310 includes a channel area, in which a channel is formed by an electric field from a gate line 350 provided in the TFTs 233a and 233b, a source area electrically connected to a source line 311 via a contact hole 81, and a drain area electrically connected to a drain line 330 provided in the TFTs 233a and 233b via a contact hole 84.

The TFT 233b has a semiconductor layer 320. The semiconductor layer 320 is formed on the underlying insulating film 12 similar to the semiconductor layer 74 which is described with FIGS. 4 and 5. The semiconductor layer 320 includes a channel area, in which a channel is formed by an electric field from the gate line 350, a source area electrically connected to a source line 321 via a contact hole 82, and a drain area electrically connected to the drain line 330 via a contact hole 83.

The gate line 350 is formed by the same film as the gate line 71G which is described with reference to FIGS. 4 and 5, that is, a conductive polysilicon film formed on the semiconductor layers 310 and 320 with a gate insulating film interposed therebetween. The gate line 350 is electrically connected to the output terminal of the inverter 232.

The source line 311 of the TFT 233b is formed by the same film as the source line 71S which is described with reference to FIGS. 4 and 5, that is, for example, a metal film such as aluminum formed on the semiconductor layer 310 with insulating films 41 and 42 interposed therebetween. The source line 311 is electrically connected to the low-potential voltage line for the scan line driving circuit for supplying the low-potential voltage VSSY for the scan line driving circuit.

The source line 321 of the TFT 233a is formed by the same film as the source line 311, that is, for example, a metal film such as aluminum formed on the semiconductor layer 320 with the insulating films 41 and 42 interposed therebetween. The source line 321 is electrically connected to the high-potential voltage line for the scan line driving circuit for supplying the high-potential voltage VDDY for the scan line driving circuit.

The drain line 330 is formed by the same film as the source lines 321 and 322, that is, for example, a metal film such as aluminum formed on the semiconductor layers 310 and 320 with the insulating films 41 and 42 interposed therebetween. The drain line 330 is electrically connected to each scan line 11a via a contact hole and a relay line (not shown).

Figure 12:
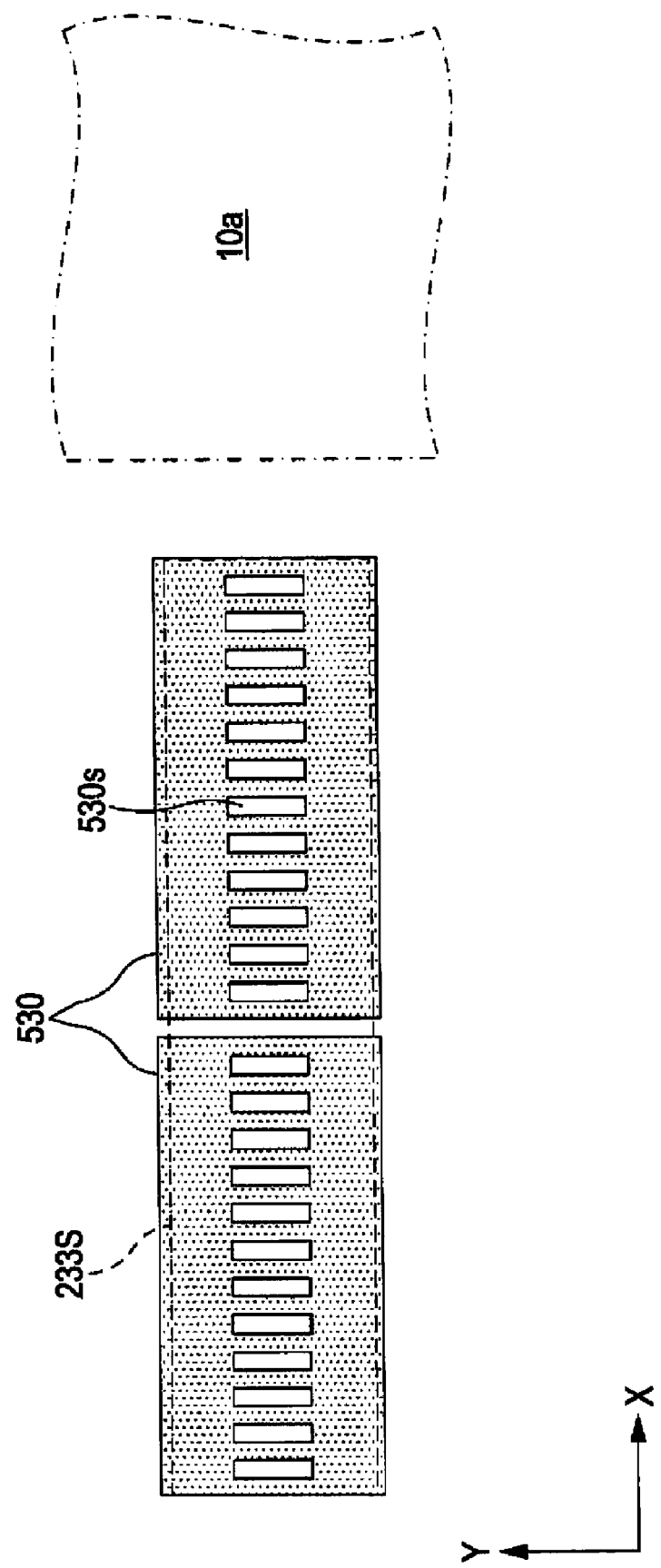
FIG. 12 is a plan view showing the configuration of a light-shielding film provided in correspondence with the inverter located at the final stage of the output side to the scan line among the plural stages of inverters configuring the output buffer.

In FIGS. 11 and 12, in the present embodiment, in particular, a light-shielding film 530 is provided in each inverter 233. The light-shielding film 530 is provided below the TFTs 233a and 233b configuring the inverter 233 with the underlying insulating film 12 interposed therebetween and is formed on the TFT array substrate 10 so as to overlap with the TFTs 233a and 233b in plan view. The light-shielding film 530 is provided in each of the plurality of inverters 233 one by one and is provided in the vicinity of the image display area 10a in a plurality in the Y direction. The light-shielding film 530 is formed of a light-shielding conductive material such as a metal element, an alloy, metal silicide, polysilicide or a lamination thereof, including at least one of high-melting-point metal such as titanium (Ti), chrome (Cr), tungsten (W), tantalum (Ta) and molybdenum (Mo), similar to the light-shielding films 510 described with reference to FIGS. 4 to 6.

As shown in FIG. 12, the light-shielding film 530 is formed so as to overlap with an area 233S in which the inverter 233 is formed, and a plurality of slits 530s are formed in the light-shielding film 530. The slits 530s are an example of the opening of the invention and are formed in the light-shielding film 530 so as to extend in the channel length direction (that is, the Y direction) of the TFTs 233a and 233b configuring the inverter 233.

Each of the plurality of slits 530s is formed in the light-shielding film 530 so as to extend in the channel length direction (that is, the X direction) of the TFTs 233a and 233b with a predetermined width of 1 μm or less. The plurality of slits 530s are formed at a predetermined interval of 1 μm in the channel width direction (that is, the X direction) of the TFTs 233a and 233b. In FIG. 12, the light-shielding film 530 is differentiated in order that each of the slits 530s has a size capable of being identified in the view.

Accordingly, the light leakage from the peripheral area surrounding the image display area 10a or the re-reflection of the return light due to the TFTs 233a and 233b configuring the inverter 233 can be suppressed by the light-shielding film 530. That is, the light leakage from the peripheral area in the vicinity of the edge of the image display area 10a in which the scan line driving circuit 104 is formed can be suppressed by the plurality of light-shielding films 530 and the reflection of the return light such as the light, which is emitted from another liquid crystal device by the rear surface reflection of the TFT array substrate 10 or a double-plate type projector and passes through the synthetic optical system, by the TFTs 233a and 233b can be suppressed. Accordingly, a brightness pattern according to the reflection or transmission of the light in the peripheral area, such as a brightness pattern according to an arrangement pattern of the plurality of inverters 233 (that is, the TFTs 233a and 233b), can be suppressed from being projected to the vicinity of the edge of the image display area 10a.

Fourth Embodiment

A liquid crystal device according to a fourth embodiment of the invention will be described with reference to FIGS. 13 and 14.

Figure 13:
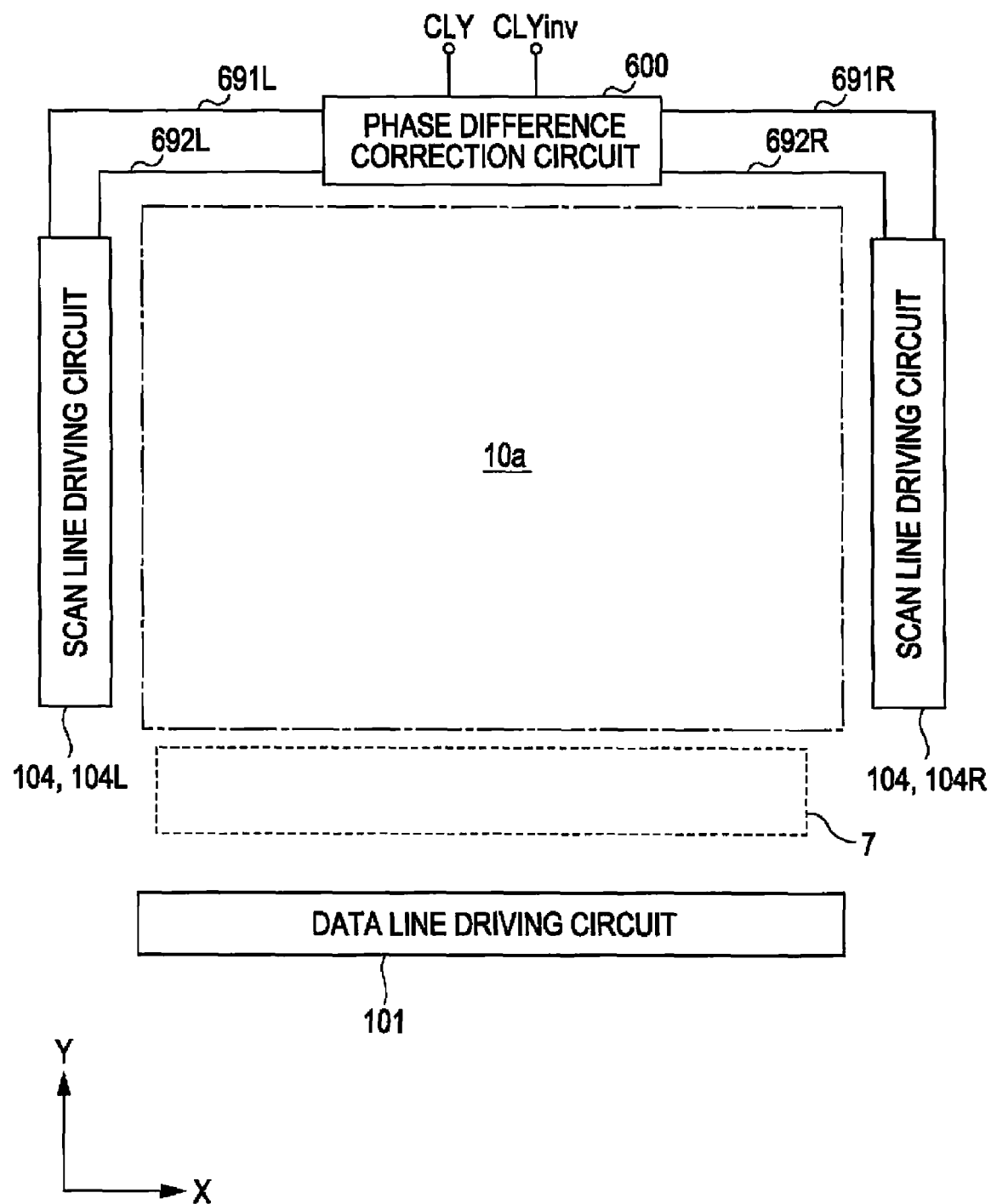
FIG. 13 is a schematic block diagram showing the configuration of a liquid crystal device according to a fourth embodiment of the invention.

FIG. 13 is a schematic block diagram showing the configuration of the liquid crystal device according to the fourth embodiment. In FIG. 13, the same components as the first embodiment shown in FIGS. 1 to 6 are denoted by the same reference numerals and thus the description thereof will be omitted.

In FIG. 13, the liquid crystal device according to the fourth embodiment is different from that of the first embodiment in that a phase difference correction circuit 600 is included in the peripheral area surrounding the image display area 10a on the TFT array substrate 10, a light-shielding film which is an example of the "light-shielding film" of the invention in correspondence with at least one of a plurality of transistors configuring the phase difference correction circuit 600 and is similar to that of the first embodiment in the other configuration.

The phase difference correction circuit 600 is provided in the vicinity of the image display area 10a (for example, in a range in which the distance from the edge of the image display area 10a is several hundreds of μm (for example, about 400 to 800 μm)). In more detail, the phase difference correction circuit 600 is provided at a position opposing across the sampling circuit 7 or the data line driving circuit 101 and the image display area 10a in the peripheral area surrounding the image display area 10a and is provided on the central line which bisects the width of the image display area 10a in the X direction. The Y clock signal CLY and the inverted Y clock signal CLYinv are supplied to the phase difference correction circuit 600.

The Y clock signal CLY is supplied from a Y clock signal terminal of the plurality of external circuit connection terminals 102 (see FIG. 1) to the phase difference correction circuit 600 via a Y clock signal line arranged in the peripheral area along the outer circumference of the TFT array substrate 10. The inverted Y clock signal CLYinv is supplied from an inverted Y clock signal terminal of the plurality of external circuit connection terminals 102 to the phase difference correction circuit 600 via an inverted Y clock signal line arranged in the peripheral area along the outer circumference of the TFT array substrate 10.

The phase difference correction circuit 600 corrects the phases of the Y clock signal CLY and the inverted Y clock signal CLYinv respectively supplied via the Y clock signal line and the inverted Y clock signal line arranged in the peripheral area and supplies the signals to the scan line driving circuit 104 (that is, two scan line driving circuit portions 104L and 104R face each other with the image display area 10a interposed therebetween). Accordingly, it is possible t drive the scan line driving circuit 104 with high precision or normally without causing malfunction.

Figure 14:
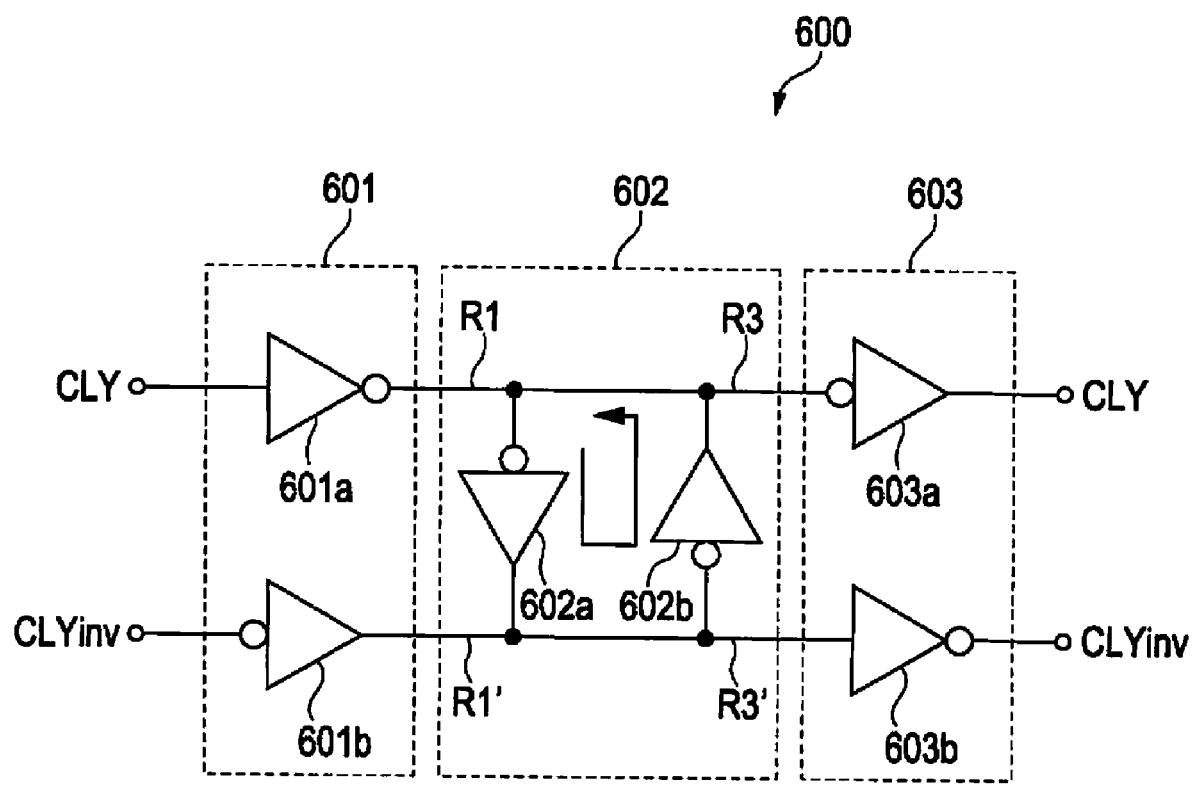
FIG. 14 is a circuit diagram showing the electrical configuration of a phase difference correction circuit.

FIG. 14 is a circuit diagram showing the electrical configuration of the phase difference correction circuit.

In FIG. 14, the phase difference correction circuit 600 includes a first buffer circuit 601, a bistable trigger circuit 602 and a second buffer circuit 603. The first buffer circuit 601 includes inverters 601a and 601b as complementary transistors. The bistable trigger circuit 602 includes inverters 602a and 602b as complementary transistors. The second buffer circuit 603 includes inverters 603a and 603b as complementary transistors.

In the phase difference correction circuit 600, the buffer circuit 601 including the inverters 601a and 601b compensates for the driving performance of the circuit for supplying the Y clock signal CLY and the inverted Y clock signal CLYinv, supplies the output of the inverter 602a of the bistable trigger circuit 602 to the input of the inverter 602b, and supplies the output of the inverter 602b to the input of the inverter 602a, such that the positive feedback is applied to the input signals of the inverters 602a and 602b so as to eliminate the phase difference. In the phase difference correction circuit 600, the second buffer circuit 603 is provided next to the bistable trigger circuit 602 and the driving performance of the bistable trigger circuit 602 is prevented from deteriorating by the function of the second buffer circuit 603.

In FIG. 13, the phase difference correction circuit 600 is electrically connected to the scan line driving circuit portion 104R of the scan line driving circuit 104 located on the right side of FIG. 13 via a Y clock signal line 691R and an inverted Y clock signal line 692R and is electrically connected to the scan line driving circuit portion 104L of the scan line driving circuit 104 located on the left side of FIG. 13 via a Y clock signal line 691L and an inverted Y clock signal line 692L.

By this configuration, the Y clock signal CLY and the inverted Y clock signal CLYinv of which the phase difference is corrected by the operation of the phase difference correction circuit 600 are input to the scan line driving circuit 104 (that is, the scan line driving circuit portions 104R and 104L). By this configuration, a line distance between the phase difference correction circuit 600 to the scan line driving circuit portion 104R and a line distance from the phase difference correction circuit 600 to the scan line driving circuit portion 104L become equal and thus the time constants of the both lines become equal. Accordingly, even in the case where a signal delay between the phase difference correction circuit 600 and the scan line driving circuit portions 104R and 104L cannot be ignored, since the signal delay amounts of the left and right scan line driving circuit portions are equal, a deviation in driving timing between the left and right scan line driving circuit portions can be prevented due to the signal delay.

In the present embodiment, in particular, light-shielding films are provided in correspondence with a plurality of inverters (that is, inverters 601a, 601b, 602a, 602b, 603a and 603b) configuring the phase difference correction circuit 600. The light-shielding films are arranged on the TFT array substrate 20 between the inverters configuring the phase difference correction circuit 600 and the TFT array substrate 10 (that is, below the complementary TFTs configuring the inverters on the TFT array substrate 10) so as to overlap with the TFTs configuring the inverters on the TFT array substrate 10 in plan view and a plurality of rectangular slits are formed in the light-shielding films in the channel length direction of the TFTs. The light-shielding films have the same plane shape as the light-shielding films 510 of the first embodiment described with reference to FIG. 6.

Accordingly, light leakage from the peripheral area surrounding the image display area 10a and re-reflection of the return light from the TFTs configuring the phase difference correction circuit 600 can be suppressed by the light-shielding films provided in the inverters of the phase difference correction circuit 600. That is, by the light-shielding films, the light leakage from the peripheral area in the vicinity of the edge of the side of the image display area 10a in which the phase difference correction 600 is formed can be suppressed and the reflection of the return light such as light, which is emitted from another liquid crystal device by the rear surface reflection of the TFT array substrate 10 or a double-plate type projector and passes through a synthetic optical system, by the TFTs configuring the inverters of the phase difference correction circuit 600 can be suppressed. Accordingly, a brightness pattern according to the reflection or transmission of the light in the peripheral area, such as a brightness pattern according to an arrangement pattern of the plurality of inverters of the phase difference correction circuit 600, can be suppressed from being projected to the vicinity of the edge of the image display area 10a.

Electronic Apparatus

Next, the application of the liquid crystal device to various types of electronic apparatuses will be described with reference to FIG. 15. Hereinafter, a projector using the liquid crystal device as a light valve will be described. FIG. 15 is a plan view showing the configuration of the projector.

As shown in FIG. 15, a lamp unit 1102 composed of a white light source such as a halogen lamp and the like is provided inside the projector 1100. The light emitted from the lamp unit 1102 is separated into three primary colors of R, G, and B by four mirrors 1106 and two dichroic mirrors 1108 disposed inside a light guide 1104 and the three primary colors are made incident to liquid crystal panels 1110R, 1110B, and 1110G as light valves corresponding to each of the primary colors.

The liquid crystal panels 1110R, 1110B, and 1110G are equal to the liquid crystal device and are driven by primary color signals of R, G, and B supplied from an image signal supply circuit 300. The light modulated by the liquid crystal panel 100 is made incident into a dichroic prism 1112 from three directions. In the dichroic prism 1112, the light of R and B is refracted at an angle of 90 degree and the light of G goes straight. Therefore, an image of each color is synthesized, whereby a color image is projected onto a screen or the like through a projector lens 1114.

Here, when attention is focused on a display image by each of the liquid crystal panels 1110R, 1110B, and 1110G, the display image by the light valve 1110G is needed to be mirror-inversed with respect to the display images by the liquid crystal panels 1110R and 1110B.

Further, since light corresponding to each of the primary colors of R, G and B is made incident to each of the liquid crystal panels 1110R, 1110G, and 1110B by the dichroic mirrors 1108, there is no need to provide a color filter.

In addition to the electronic apparatus described in FIG. 15, there are a mobile personal computer, a cellular phone, a liquid crystal television set, a viewfinder-type or direct-view monitor type video tape recorder, a car navigation system, a pager, an electronic organizer, an electronic calculator, a word processor, a workstation, a videophone, a POS terminal, and a touch-panel-equipped device. The above-described electronic apparatus can be implemented as a display unit of such exemplary electronic devices.

The invention is not limited to the above-described embodiments and may be properly modified without departing from the scope or the spirit of the invention. The modified electro-optical device and the electronic apparatus having the electro-optical device are included in the technical scope of the invention.

What is claimed is:

1. An electro-optical device comprising:
    a substrate;
    a plurality of pixel electrodes;
    a pixel area where the plurality of pixel electrodes are arranged;
    a peripheral area that surrounds the pixel area;
    a transistor provided in the peripheral area; and
    a light-shielding film that is interposed between the transistor and the substrate, the light-shielding film at least partially overlapping with the transistor in plan view and having a plurality of openings overlapping with the transistor in plan view, each of the plurality of openings extending in the channel length direction of the transistor,
    wherein the plurality of openings are formed at a predetermined interval in a channel width direction of the transistor.

2. The electro-optical device according to claim 1, wherein the openings at least partially overlap with a channel area of the transistor on the substrate in plan view.

3. The electro-optical device according to claim 1, wherein the width of each of the openings is 1 µm or less.

4. The electro-optical device according to claim 1, wherein the light-shielding film includes:
    a first light-shielding portion having the openings; and
    a second light-shielding portion, which is formed adjacent to the first light-shielding portion, is located farther from the pixel area than the first light-shielding portion and has a plane pattern different from that of the first light-shielding portion.

5. The electro-optical device according to claim 4, wherein the second light-shielding portion is formed so as not to at least partially overlap the transistor on the substrate in plan view.

6. The electro-optical device according to claim 1, wherein the channel width of the transistor is 5 µm or more.

7. The electro-optical device according to claim 1, wherein the channel width of the transistor is larger than the channel length of the transistor.

8. The electro-optical device according to claim 1, further comprising:
    a plurality of scan lines and a plurality of data lines arranged in the pixel area; and
    an image signal line provided in the peripheral area so as to supply an image signal,
    wherein the transistor supplies the image signal supplied to the image signal line to the plurality of data lines according to a sampling signal and is formed as a plurality of sampling transistors arranged in correspondence with the plurality of data lines.

9. The electro-optical device according to claim 1, further comprising another transistor that is complementary to the transistor.

10. An electronic apparatus comprising the electro-optical device according to claim 1.

* * * * *